BONDING APPARATUS

Filed Nov. 2, 1960 4 Sheets-Sheet 1

INVENTORS: P. A. BYRNES, JR.
T. E. DAVIS
E. C. MENER
BY John C. Morris
ATTORNEY

BONDING APPARATUS

Filed Nov. 2, 1960 4 Sheets-Sheet 2

INVENTORS: P. A. BYRNES, JR.
T. E. DAVIS
E. C. MENER
BY John C. Moris
ATTORNEY

BONDING APPARATUS

Filed Nov. 2, 1960 4 Sheets-Sheet 3

INVENTORS: P. A. BYRNES, JR.
T. E. DAVIS
E. C. MENER
BY John C. Morris
ATTORNEY

INVENTORS: P. A. BYRNES, JR.
T. E. DAVIS
E. C. MENER
BY
ATTORNEY 3,048,690
Patented Aug. 7, 1962

3,048,690

BONDING APPARATUS

Peter A. Byrnes, Jr., Somerville, Thomas E. Davis, Metuchen, and Edward C. Mener, Somerville, N.J., assignors to Bell Telephone Laboratories, Incorporated, New York, N.Y., a corporation of New York Filed Nov. 2, 1960, Ser. No. 66,792
18 Claims. (Cl. 219—85)

This invention relates to apparatus for securing conductive leads to semiconductive devices, and particularly to such apparatus which utilizes compression bonding techniques.

The small size of semiconductive devices has complicated the task of completely mechanizing their production. A particular problem lies in bonding conductive leads which are often finer than a human hair to the contact areas of each device. Presently, the bonding of these leads requires meticulous and time consuming care. Part of the difficulty arises from the lack of continuous control of each individual lead employed. Thus, for each bond made, an operator has to search for and exert control over an unsupported end of a tiny lead. An additional problem derives from the fact that the bonding tools employed have to be accurately reoriented for each bond made. Accordingly, the manufacture of each transistor requires the repetition of a plurality of individual bonding steps. Such procedures are incompatible with the mechanization of the bonding operation.

An object of this invention is to provide a bonding apparatus that lends itself to the mechanization of the bonding operation.

Specifically, an object of this invention is to provide a bonding tool that is essentially frictionless and therefore once oriented does not become misaligned due to binding or wear but consistently applies a predetermined force at a preselected location.

Another object of this invention is to provide an apparatus that automatically positions a pair of bonding tools and a conductive lead in the proper relationship to two spaced contact areas of a semiconductive device for the bonding of the lead thereto.

A further object of this invention is to provide an apparatus that automatically bonds the conductive lead to the two spaced contact areas of the semiconductive device and then parts the lead between the contact areas.

These and other objects of this invention are achieved in an illustrative embodiment thereof wherein the bonding apparatus consists of a pair of cantilever spring hinged bonding tools, the longitudinal axes of which lie along a common axis and the free ends of which are spaced one from the other, are pretensioned downward, and include a bonding edge; a conductive lead underlying the bonding tools and extending along the longitudinal axes thereof; a parting wire underlying the conductive lead and extending at right angles thereto and between the spaced ends of the bonding tools; means for receiving a semi-conductive device and heating it to a preselected temperature; means for orienting the semiconductive device so that a pair of spaced contact areas thereof respectively underlie the conductive lead and the bonding edges of the bonding tools; means for sequentially lowering the free ends of the bonding tools against the contact areas, the pretension in the free ends exerting a preselected force that bonds the lead to the contact areas; and means for lifting the parting wire while the bonding tools are in the bonding position, thereby parting the conductive lead between the bonds.

A complete understanding of the invention and of these and other features and advantages thereof may be gained from consideration of the following detailed description taken in conjunction with the accompanying drawing wherein one embodiment of the invention is illustrated. It is to be expressly understood, however, that the drawing is for the purposes of illustration and description and is not to be construed as defining the limits of the invention.

Figures 1, 2:
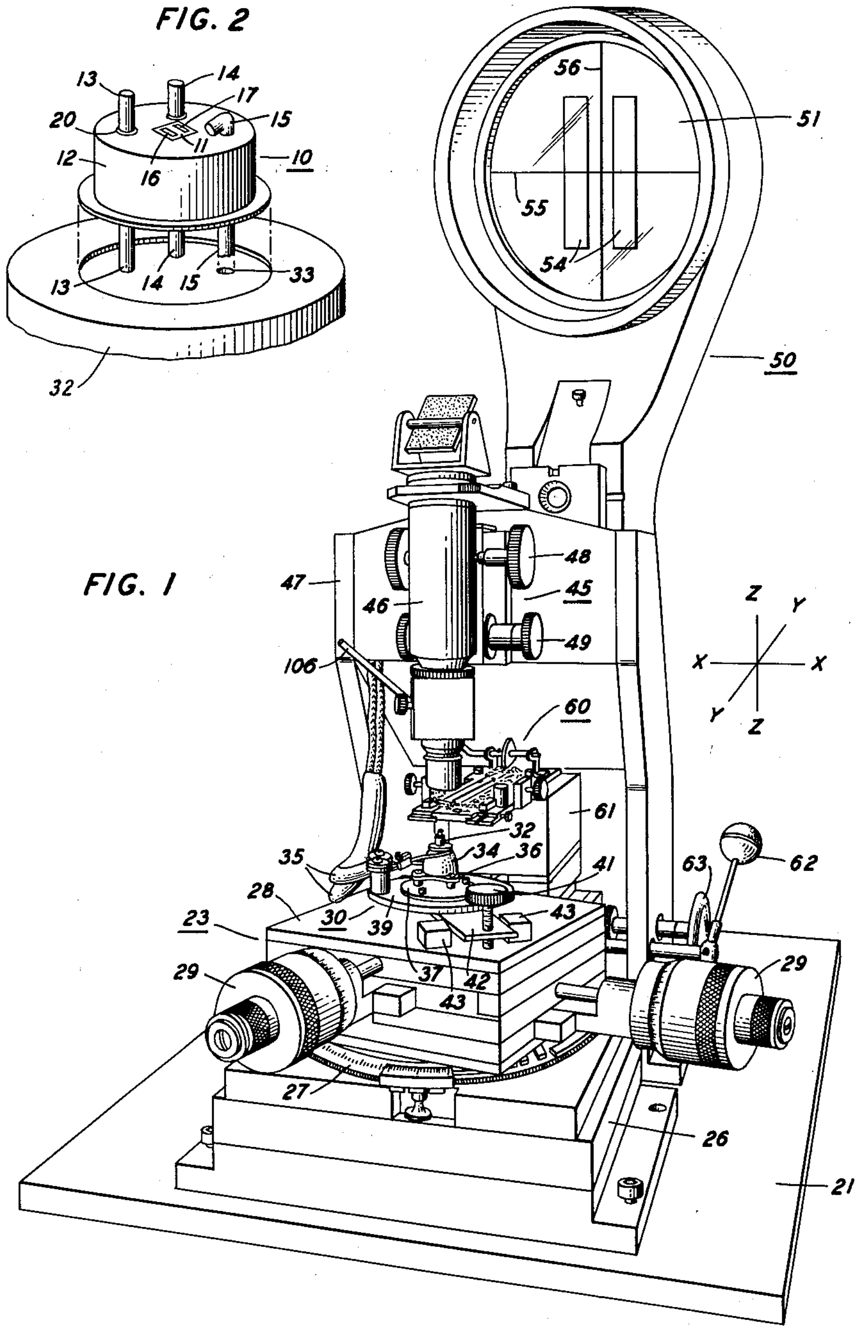
FIG. 1 is a perspective view of the bonding apparatus of this invention.
FIG. 2 is an enlarged perspective view of a transistor and a portion of the socket for receiving the transistor.

The embodiment of the invention illustrated in FIG. 1 is adapted to bond conductive leads to a transistor 10. As is best seen in FIG. 2, a transistor normally includes a semiconductive wafer 11 mounted upon a body portion 12. The semiconductive wafer is divided into three regions known as the base, emitter, and collector. These regions are individually connected to circuitry external to the transistor by means of a base terminal 13, an emitter terminal 14, and a collector terminal 15.

Each region of the wafer 11 must be electrically connected to its associated terminal. Ordinarily, one of the regions of the wafer, the collector, for example, is directly connected to the body portion 12 of the transistor. Therefore, the collector terminal 15 need only be joined to the body portion 12 in order to be connected to the collector region.

The electrical connection of the emitter and base regions to their respective terminals, however, is not so readily effected. Often a separate contact area or metallic stripe, which may be of aluminum, is sputtered onto each of these regions to form electrodes. Thus, in the wafer 11, an electrode stripe 16 is sputtered or otherwise applied to the base region and an electrode stripe 17 is sputtered or otherwise applied to the emitter region. These electrode stripes are electrically connected to their respective terminals 13 and 14 by means of extremely fine conductive leads normally made of gold wire. The terminals, in turn, are inserted through the body portion 12 and supported by means of insulating sleeves 20. Accordingly, a bonding operation is required wherein conductive leads are bonded to the electrode stripes 16 and 17 and subsequently bonded to the terminals 13 and 14. The electrode stripes may be, for example, one mil by six mils in size, and the conductive lead may have a diameter of 0.4 mil.

The apparatus by which this bonding operation is achieved is more easily described if orthogonal axes X, Y, and Z are utilized for reference purposes. In this reference system, the X and Y axes define a horizontal plane and the Z axis defines a vertical axis extending perpendicularly therethrough.

As shown in FIG. 1, the bonding apparatus includes a stand 21 to which is secured an orientation unit 23. The orientation unit comprises a base 26 that supports a rotatable platform 27, the platform rotating about the Z axis. The top surface of the platform is horizontal, and a cross slide stage 28 is mounted thereon. The stage is equipped with barrel-type micrometer screws 29 that move it along perpendicularly intersecting axes in a horizontal plane.

Overlying the cross slide stage 28 is a heater assembly 30. The heater assembly has a transistor socket 32 secured thereto, and, as shown in FIG. 2, the socket is provided with three holes 33 positioned so as to accommodate the terminals 13, 14, and 15 of the transistor 10. Advantageously, the socket is removably secured to the heater assembly so that different sockets may be substituted to accommodate different types of transistors. The heater assembly is adapted to rapidly heat the socket and the transistor held thereby to a particular bonding temperature, yet allow the other elements of the orientation unit to remain close to room temperature. Typically, the transistor is heated to a temperature of 300 degrees centigrade. In the present embodiment the heater assembly comprises an insulated wire coil 34 to which electrical energy is supplied by conductors 35. The insulated coil is secured to a ceramic support 36 that is fastened to a ceramic disc 37 and spaced therefrom by ceramic stand offs. The ceramic disc is, in turn, fastened to a base plate 39, a sheet of asbestos being placed therebetween for added thermal insulation.

The base plate 39 of the heater assembly 30 is fastened to a plunger (not shown) that is mounted in the cross slide stage 28 and that moves up and down along accurately aligned vertical ways. The plunger moves the heater assembly and thereby the transistor holding socket between a lower and an upper position, the plunger being normally located in the lower position and being moved to the upper position by means of an air bellows (not shown). The distance that the plunger moves is controlled by an adjustment screw 41 threaded through a lever 42 that is pivotally mounted in blocks 43 fastened to the stage. Upward movement of the plunger causes the lever to pivot so as to move the adjustment screw toward the upper surface of the stage, the movement of the plunger being stopped when the lower end of the screw strikes the stage. Thus, the distance between the stage and the end of the screw when the plunger is in its lower position determines the vertical distance that the plunger can move.

In the employment of the orientation unit 23, the plunger is operated to move the transistor 10 to the upper position to place the electrode stripes 16 and 17 of the transistor in a particular horizontal plane, hereinafter referred to as the bonding plane. The rotatable platform 27 and the cross slide stage 28 are then operated to move the transistor 10 to a preselected position in the bonding plane. This preselected position is hereinafter referred to as the bonding position. In the present embodiment an optical system 45 is used to locate the transistor in the bonding position.

The optical system 45 comprises a microscope 46 mounted on an upright support 47 that is attached to the stand 21. The microscope is fixed horizontally, but it is movable vertically by means of a coarse adjustment knob 48 and a fine adjustment knob 49. The knobs permit the microscope to be accurately focused on the electrode stripes 16 and 17 of the transistor 10, the microscope being focused while the electrode stripes are positioned in the bonding plane. A projection system 50 associated with the microscope projects an image of the stripes onto a screen 51, the image being enlarged, for example, two hundred times. The screen is advantageously provided with two rectangular patterns 54 which correspond to the bonding position of the stripes. The operator of the bonding apparatus may thus readily orient the transistor by manipulating the micrometer screws 29 and the rotatable platform 27 until the images of the stripes 16 and 17 fit into the rectangular pattern. The screen is further provided with perpendicularly intersecting cross hairs 55 and 56 that respectively correspond to the X and Y axes of the reference system. The purpose of these cross hairs is hereinafter explained.

Orienting means which require operator control have been shown in FIG. 1 for the sake of simplicity. However, positioning of the transistor 10 may be automatically effected by means of an apparatus for positioning a transistor by use of the optical reflectance characteristics of the electrode stripes. This apparatus is described in a copending patent application of T. E. Davis, Serial No. 782,215, filed December 22, 1958, and assigned to the assignee of the present application.

With the transistor 10 oriented in the bonding posiiton, the plunger is lowered, moving the electrode stripes 16 and 17 of the transistor from the bonding plane, and a tool carrier 60 is moved forward preparatory to the bonding operation. The tool carrier is supported by a pedestal 61 which is mounted on the stand 21 so as to be movable relative thereto. A crank 62 is provided to move the pedestal either forward or backward along a dovetail slide (not shown) extending parallel to the Y axis of the reference system, and a micrometer screw 63 is provided to move the slide and thereby the pedestal sideways, parallel to the X axis. The distance that the pedestal is moved by the operation of the crank is determined by adjustable stops (not shown).

Figures 3, 4:
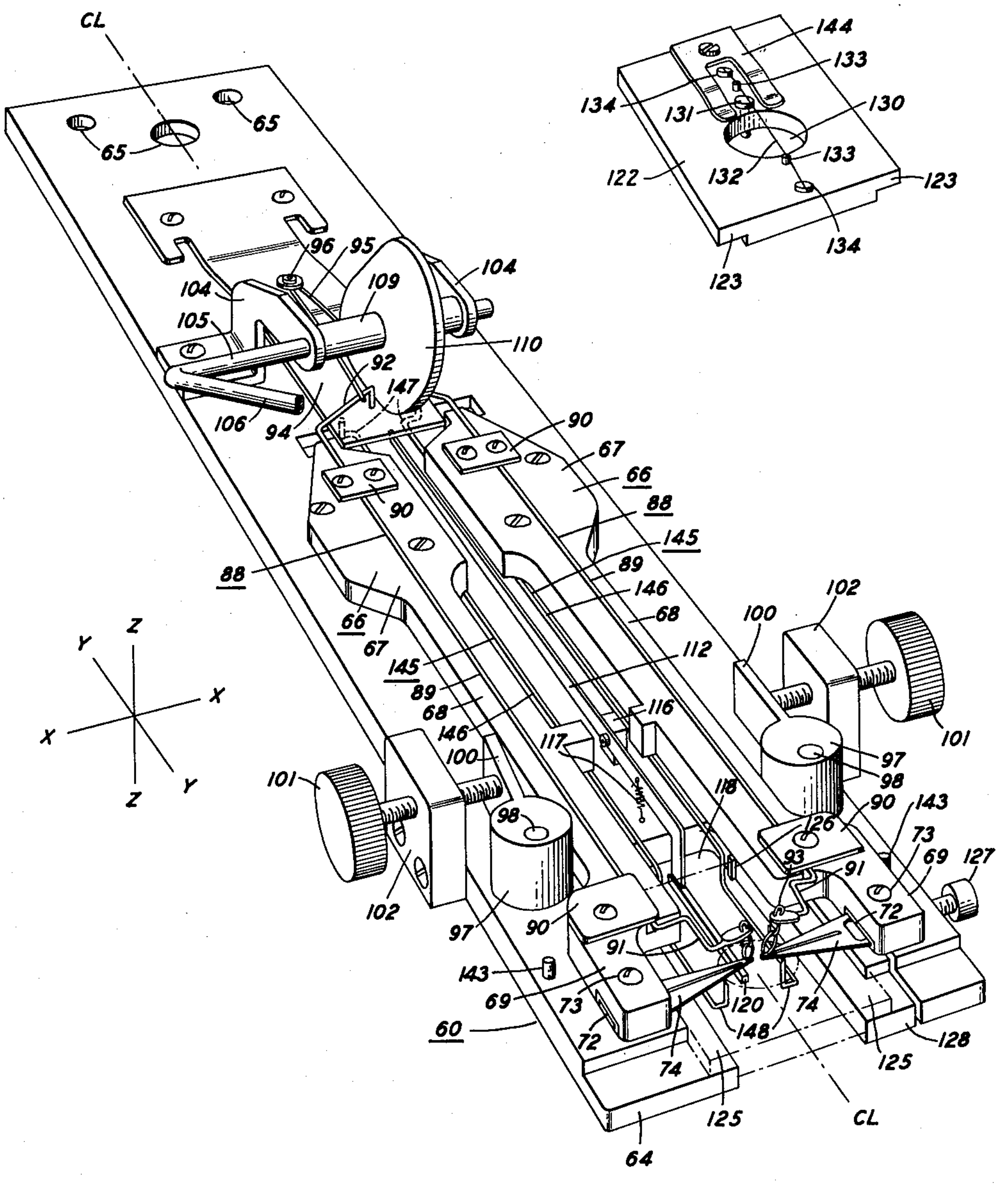
FIG. 3 is a perspective view of the tool carrier with the parting wire carrier shown in position thereon in phantom.
FIG. 4 is a perspective view of the parting wire carrier.

As shown most clearly in FIG. 3, the tool carrier 60 comprises a carrier plate 64, the longitudinal axis of which extends parallel to the Y axis. The rear end of the plate is secured to the pedestal 61, as by fasteners extending through apertures 65, and the plate extends horizontally forward from the pedestal. A pair of spaced tool supports 66 are mounted on the plate, the longitudinal axis of the supports extending substantially parallel to the longitudinal axis of the plate. Each support comprises a relatively wide base portion 67, a relatively narrow elongated body portion 68, and a tool holding portion 69. Only the base portions of the supports are fastened to the carrier plate, the body portions merely resting on the surface of the plate and the tool holding portions being spaced from the plate.

The tool holding portion 69 of each tool support 66 has a tool block 72 mounted in a slot in the underside thereof by means of a fastener 73 and each tool block, in turn, has one end of a cantilever bonding tool 74 affixed as by swaging in a slot in the underside thereof. The tool block holds the bonding tool so that the longitudinal axis of the tool extends perpendicularly to the longitudinal axis of the tool support, and as the longitudinal axis of the tool support extends substantially parallel to the Y axis, the longitudinal axis of the bonding tool extends substantially parallel to the X axis. In addition, the tool block holds the bonding tool so that the bottom surface of the secured end of the tool lies in the bonding plane.

Figure 5:
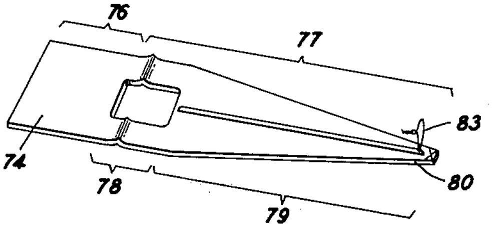
FIG. 5 is a perspective view of one of the bonding tools of this invention.

As illustrated in FIG. 5, each cantilever bonding tool 74 includes a secured portion 76 that is mounted to the underside of the tool block 72 and an unsecured portion 77 that has a spring hinge section 78 and a rigid section 79. The spring hinge section provides the tool with a pretension in the downward direction, and the rigid section applies the force generated as a result of the pretension against the elements to be bonded.

The pretension in the bonding tool 74 is achieved by introducing a permanent deformation or set in the spring hinge section 78. The spring hinge is stressed beyond its elastic limit by bending downward the portion of the hinge adjacent to the rigid section 79 along an axis extending transversely to the longitudinal axis of the bonding tool. The deformation introduced is such that when the tool is in a relaxed condition, it assumes the downturned position shown in phantom in FIG. 6; and when the tip 80 of the bonding tool is raised to the point where it lies in the plane of the supported portion 76, as shown in full in FIG. 6, the tip exerts the desired bonding force. Typically a pressure of approximately 20,000 pounds per square inch is utilized for the bonding operation, and for the bonding tools herein described, this is equivalent to a spring force of about nine grams. It is evident that the permanent deformation in the spring hinge can be readily adjusted to provide this force, and once the spring hinge is so adjusted, it will consistently apply the same force so long as it is not inadverently again stressed beyond its elastic limit.

The axis along which the spring hinge section 78 is permanently deformed is advantageously located one-third of the length of the hinge from the supported portion 76 and two-thirds of the length of the hinge from the rigid section 79. With this relationship when the tip 80 of the tool is positioned in the plane of the supported portion, the rigid section 79 also lies in this plane, rather than at some angle to the plane. The force exerted by the tip is therefore applied normal to this plane and not at some other angle thereto. Since the supported portion of the bonding tool lies in the bonding plane, the tip exerts a force normal to the bonding plane. This is important because a force directed other than perpendicular to an electrode stripe during the bonding of a conductive lead thereto tends to cut the lead rather than bond it to the stripe.

The spring hinge section 78 is sufficiently flexible so that a small deviation of the tip 80 of the bonding tool 74 from the bonding plane produces little change in the force exerted thereby. This provides some degree of tolerance in the positioning of the electrode stripes 16 and 17 in the bonding plane. The height of the transistor body or of the stripes can vary from transistor to transistor in the order of a mil or two without appreciably affecting the force applied by the bonding tool in the bonding operation. One means of accomplishing the desired flexibility is removing the center portion of the spring hinge to reduce the cross section thereof. This provides flexibility, but at the same time retains stability, as the two legs formed by the removal of the center portion prevent lateral shifting of the bonding tool.

The rigid section 79 of each bonding tool 74, is as its name implies, stiff as compared to the flexibility of the spring hinge section 78. Being stiff the rigid section does not bend or flex when the tip 80 of the tool comes in contact with a conductive lead and bonds it to an electrode stripe of a transistor. There is, therefore, no sliding movement of the tip in the plane of the stripe during the bonding operation. Such movement would cut the conductive lead rather than bond it to the stripe. In the bonding tool shown in FIG. 5, the stiffness of the rigid section is achieved by embossing the section to form a ridge along the longitudinal axis theerof. Another way of providing a rigid section would be to bend up the sides of the section to form a U-shaped channel. Or the rigid section could be a separate rigid piece secured to the spring hinge section.

The rigid section 79 is advantageously triangular in shape so as to approximate a constant stress cantilever member in which the cross section decreases at approximately the same rate as the stress in the member decreases. The triangular shape maintains the desired stiffness but keeps weight to a minimum. It also provides a small tip that can be readily located in the correct position.

Figures 6, 7:
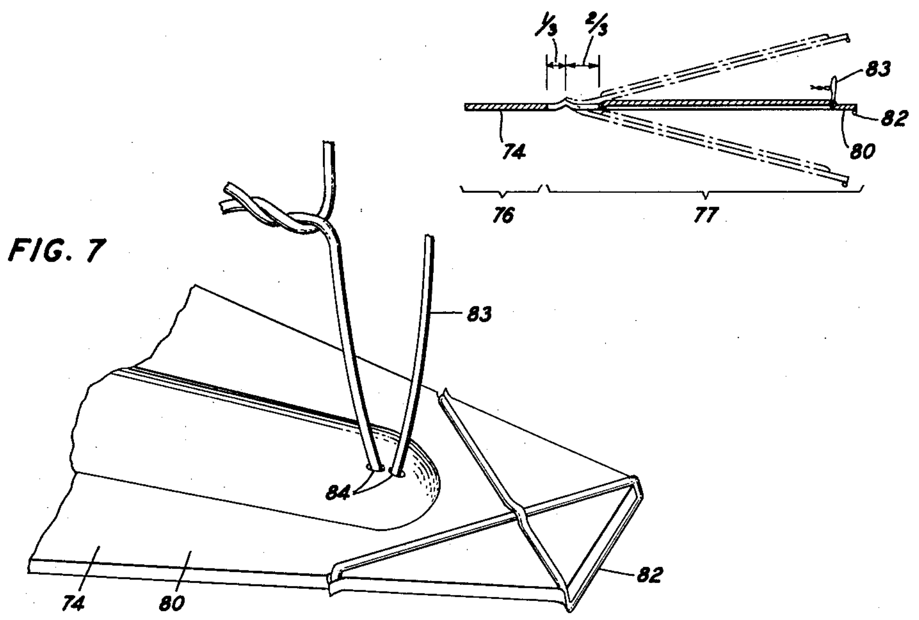
FIG. 6 is a cross sectional view of the bonding tool showing the unsecured portion of the tool in a raised position in phantom, in a bonding position in full, and in a relaxed position in phantom.
FIG. 7 is an enlarged perspective view of the tip of the bonding tool.

Referring now to FIG. 7, it is seen that the tip 80 of the rigid section 79 is blunted, and the underside thereof is provided with a bonding edge 82, the edge providing the surface of contact between the bonding tool and the element to which the bonding force is applied. It is, of course, very desirable that the size and shape of the bonding edge be uniform, determinable, and reproducible because the dimensions of the bonding edge are one of the parameters to be considered in determining the amount of pretension needed in the bonding tool to produce the desired bonding action. In the present invention a uniform, determinable, and reproducible bonding edge is achieved by securing a wire to the bottom surface of the tip end. As shown in FIG. 7, one way of securing the wire to the end is by wrapping the wire along the bottom surface of the tip, up through grooves in the corners diagonally across the upper surface of the tip and then staking the ends of the wire in slots in the sides. Typically, the wire has a diameter two and one-half times the diameter of the conductive lead to be bonded to the electrode stripes of the transistor and is made of tungsten.

The tip 80 of the rigid section 79 is also provided with means, such as a bail 83, by which the unsecured portion 77 of the bonding tool may be lifted as shown in phantom in FIG. 6, above the plane of the secured portion 76 so as to raise the bonding edge 82 above the bonding plane. As illustrated in FIG. 7, the bail may be formed by threading a wire through a pair of apertures 84 in the tip, making a loop in the wire and then tying the ends together. It is desirable that the bail be secured to the tip as close to the bonding edge as is feasible so as to eliminate any possible flexure of the tip between the point of support and the bonding edge.

The cantiliver bonding tool 74 herein described has several decided advantages over bonding tools presently in use. It is essentially frictionless and therefore there is no possibility that binding or wear due to friction will affect the position of the bonding edge or the bonding force applied by the edge. Thus the location of the bonding edge and the force applied thereby can be accurately controlled. In addition, the bonding tool does not depend upon gravity to provide the bonding force and therefore the bonding operation is not restricted to a horizontal plane. If found to be more convenient, the conductive lead could be bonded to the electrode stripes with the stripes positioned in a vertical or any other plane.

Turning again to FIG. 3, the flexure of the unsecured portions 77 of the bonding tools 74 is controlled by a pair of lifter rods 88, stem portions 89 of which are respectively received by and journaled in longitudinal grooves formed in the upper surfaces of the tool supports 66. The stem portions are respectively held in place by cover plates 90 extending thereover and fastened to the supports. Front portions 91 and rear portions 92 of the rods extend transversely from the stem portions toward the center line of the carrier plate 64. The front portions overlie the bonding tools and are provided with hooks 93 that receive the bails 83 of the tools. The rear portions overlie the free end of a cantilever follower spring 94, the fixed end of which is fastened to the carrier plate, and the rear portions are biased against the follower spring by the ends of a wire spring 95 that is secured to the top of the follower spring by a rivet 96. Up and down movement of the follower spring, therefore, produces an up and down movement of the rear portions that rotates the stem portions, and this rotation, in turn, produces a corresponding up and down motion of the front portions that raises and lowers the tips of the bonding tools.

The position of the bonding tools 74 in the bonding plane is controlled by cams 97 that are journaled on shafts 98 mounted in the carrier plate 64. The cams are contiguous with the outside edges of the body portions 68 of the tool supports 66, and each cam has a tab 100 extending radially therefrom. Adjustment screws 101 are threaded through blocks 102 affixed to the outside edges of the carrier plate, and the screws engage the tabs when moved toward the center line of the plate. The adjustment screws are thus able to rotate the cams, and the cams, in turn, deflect the forward ends of the tool supports and the lifter rods 88, moving the bonding tools substantially parallel to the X axis over short distances. The cams provide a reduction in the motion of the adjustment screws that permits a fine adjustment of the position of the bonding tools, and, as each adjustment screw is independent of the other, the tools are adjusted independently.

Fastened to the carrier plate 64 to the rear of the tool supports 66 is a pair of spaced upstanding arms 104. A leg 105 of a lever 106 is journaled in the arms, and a hub 109 having a disc cam 110 mounted thereon is secured to the leg, the leg supporting the cam a spaced distance above the surface of the carrier plate. The free end of the follower spring 94 is biased against the profiled circumference of the cam, and rotation of the cam by the operation of the lever therefore deflects the follower spring up and down.

Besides operating the lifter rods 67, the follower spring 94 also operates a parting wire lever 112. The parting wire lever extends along the Y axis and is pivotally mounted to an upstanding post 116 of the carrier plate 64. The rear end of the lever underlies the follower spring and is biased thereagainst by a coil spring 117. The front end of the lever is offset downward, extending through a cutout 118 in the carrier plate and terminating in a bar portion 120 that extends parallel to the plane of the plate.

Figure 9:
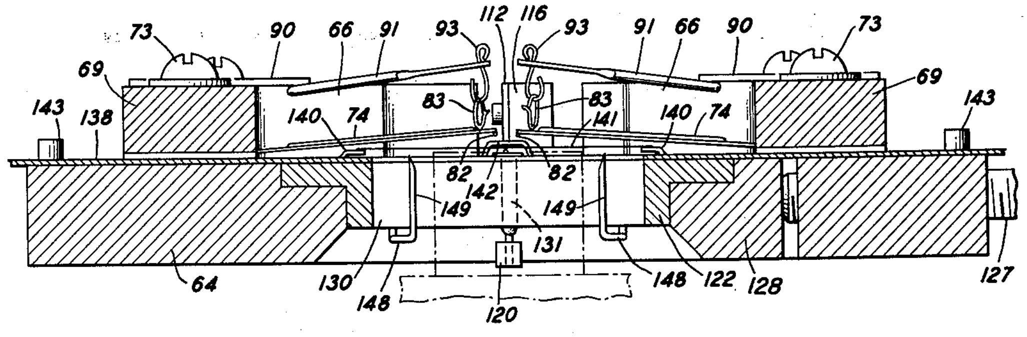
FIG. 9 is an enlarged cross sectional view of the tool carrier with the conductive lead support positioned thereon and a transistor in phantom in position for the bonding operation.

A parting wire carrier 122, illustrated in FIG. 4, is positioned in the cutout 118, the carrier having shoulders 123 that rests on ways 125 of the carrier plate 64 and position the top surface of the carrier flush with the top surface of the plate. The parting wire carrier is removably mounted on the carrier plate so as to permit the use of different carriers for different types of transistors. A pair of stops 126 (only one of which is visible) project into the cutout and locate the carrier in its proper position. A set screw 127, which, as seen most clearly in FIG. 9, is threaded through the plate 64, is operated to engage and flex a cantilever arm 128 of the plate and lock the carrier in place.

The parting wire carrier 122 has an aperture 130 of a size to receive the transistor 10 on which the bonding operation is to be performed, and an axially slidable nailhead pin 131 is mounted in the carrier to the rear of the aperture. A parting wire 132, which is stretched tautly over posts 133 and staked at 134, overlies the aperture and the pin, the wire extending parallel to the Y axis and lying in a plane just above the bonding plane when the carrier is positioned on the carrier plate 64. When the follower spring 94 pivots the bar portion 120 of the parting wire lever 112 upward, the bar portion raises the pin, and the head of the pin lifts the parting wire. As hereinafter described in greater detail, the lifting of the parting wire parts the conductive lead subsequent to the bonding of the lead to the electrode stripes of the transistor. The wire is advantageously formed of tungsten and has a diameter comparable to the diameter of the bonding edge 82 of the bonding tools 74.

Figure 8:
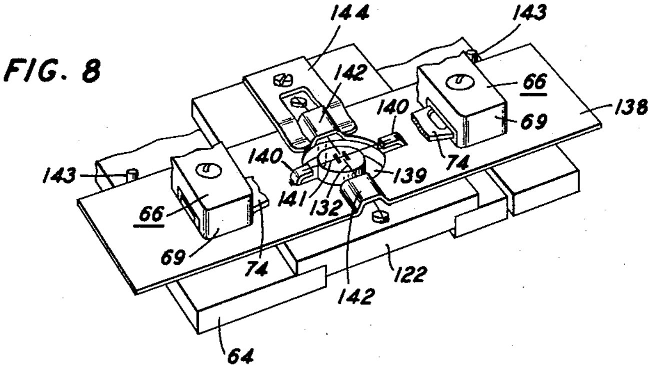
FIG. 8 is a perspective view of a portion of the tool carrier with the conductive lead support positioned thereon.

Referring now to FIG. 8, a conductive lead is located over the parting wire 132 and the electrode stripes 16 and 17 of the transistor 10 by means of a conductive lead support 138. The support has an aperture 139 therein that is approximately the same size as the aperture 130 in the parting wire carrier 122 (FIG. 4) and tabs 140 on opposite sides of the aperture suspend a conductive lead 141 over the aperture, the lead extending along the longitudinal axis of the support. The support is inserted between the carrier plate 64 and the tool holding portions 69 of the tool supports 66, the support resting on the top surface of the carrier plate and the parting wire carrier. Ridges 142 are provided in the support to allow the support to move past the posts 133 (FIG. 4) of the carrier. Stops 143 of the carrier plate locate the support in the proper position and a clamping spring 144 fastened to the carrier holds the support in place. When properly situated, the support positions the conductive lead over the parting wire, under the bonding edges 82 (FIG. 7) of the bonding tools 74, and parallel to the Y axis of the reference system whereby it extends along the longitudinal axis of the bonding tools and intersects the bonding edges and the parting wire 132 at right angles.

Turning also to FIG. 3, the conductive lead 141 is separated from the conductive lead support 138 by means of cutter rods 145 that are also operated by the follower spring 94. Stem portions 146 of the cutter rods are received by and journaled in longitudinal grooves formed in the upper surface of the carrier plate 64, the stem portions being held in the grooves by portions of the tool supports 66. Rear portions 147 of the cutter rods extend transversely from the stem portions away from the center line of the carrier plate and underlie the follower spring. As in the case of the lifter rods 88, the rear portions are biased against the follower spring by the ends of a wire spring (not shown) the spring being mounted to the bottom of the follower spring by the rivet 96. Front portions 148 of the rods turn down through the cutout 118 in the carrier plate, extend forward parallel to the plane of the plate and then extend sideways toward the center line of the plate. The front portions are terminated by upturned knife edges 149 (FIG. 9). Up and down movement of the follower spring produces a corresponding up and down movement of the rear portions that rotates the stem portions, and the rotation of the stem portions, in turn, produces an up and down motion of the front portions that is the exact opposite of the motion of the rear portions, that is, when the rear portions move down the front portions move up. As shown in FIG. 9, the knife edges of the front portions extend through the aperture 130 in the parting wire carrier 122 and underlie the conductive lead 141 secured to the conductive lead support 138.

Turning now to FIGS. 1 and 2, in the operation of the bonding apparatus a transistor 10 is placed in the socket 32 of the heater assembly 30, and electrical energy is supplied to the assembly through conductors 35 to commence to heat the transistor to the proper bonding temperature. The plunger (not shown) of the orientation unit 23 is operated to raise the heater assembly the distance necessary to place the electrode stripes 16 and 17 of the transistor in the bonding plane, and as the microscope 46 of the optical system 45 is focused on the bonding plane, the positioning of the electrode stripes in this plane brings the stripes into focus on the projection screen 51. The rotatable platform 27 and the cross slide stage 28 are then manipulated to locate the projected image of the electrode stripes in the rectangular patterns 54 inscribed on the screen, thereby locating the electrode stripes in the bonding position.

Referring now also to FIGS. 3 and 4, with the transistor 10 properly oriented, the plunger is lowered, moving the transistor from the bonding plane, and the parting wire carrier 122 for the particular transistor on which the bonding operation is to be performed is placed in the cutout 118 of the carrier plate 64. The stops 126 of the plate locate the parting wire carrier in the proper position relative to the plate, and the carrier is locked in place by the deflection of the cantilever arm 128 by the set screw 127. The crank 62 is operated to move the pedestal 61 and thereby the tool carrier which is supported by the pedestal forward, and in this position the aperture 130 in the parting wire carrier overlies the transistor mounted in the socket 32 of the heater assembly 30 and underlies the microscope 46 of the optical system 45. Since the parting wire carrier suspends the parting wire 132 across the aperture therein and the parting wire lies approximately in the bonding plane, the wire appears in focus on the projection screen 51. By means of the micrometer screw 63, the pedestal and thereby the tool carrier is moved parallel to the X axis to place the image of the parting wire in coincidence with the cross hair 56 on the screen. The parting wire is in this way properly located with respect to the electrode stripes 16 and 17 of the transistor.

The lever 106 is then moved in a clockwise direction as viewed in FIG. 3 so as to rotate the cam 110 to depress the follower spring 94 which, in turn, pivots the lifter rods 88 so as to lower the bonding tools 74 into the bonding plane. In this position the tips 80 of the bonding tools are in focus on the projection screen 51, and the adjustment screws 101 mounted on the carrier plate 64 are individually operated to position the bonding edges 82 (FIG. 7) of the bonding tools in the rectangular patterns 54 on the projection screen, thereby orienting the bonding edges relative to the electrode stripes 16 and 17 of the transistor 10.

Following the orientation of the bonding tools 74, the lever 106 is operated to raise the tips 80 of the bonding tools from the bonding plane, and the conductive lead support 138, as shown in FIG. 8, is inserted between the carrier plate 64 and the tool holding portions 69 of the tool supports 66. The stops 143 of the plate locate the support in the proper position relative to the plate, and the clamping spring 144 of the parting wire carrier 122 holds the support in place. The support suspends the conductive lead 141 just above the parting wire 132 and at right angles thereto, and as the conductive lead lies approximately in the bonding plane, the lead appears in focus on the projection screen 51. By means of the stop (not shown) that controls the forward position of the pedestal 61, the pedestal and thereby the carrier plate are moved parallel to the Y axis to place the image of the conductive lead in coincidence with the cross hair 55 on the screen, locating the conductive lead in the proper position relative to the electrode stripes 16 and 17 of the transistor 10.

It is apparent that the above-described adjustments of the tool carrier 60 and of the bonding tools 74 mounted thereto need only be made once for a particular type of transistor. The carrier plate 64 when moved to its forward position automatically locates the bonding tools 74, the parting wire 132, and the conductive lead 141 in the proper position relative to the electrode stripes. Then by operating the plunger of the orientation unit 23 to raise the transistor and place the electrode stripes 16 and 17 thereof in the bonding plane, the elements are automatically positioned in the proper relationship with respect to each other.

Referring to FIGS. 3, 4, 9, and 10, once the elements are so oriented, the lever 106 is moved in a clockwise direction, rotating the disc cam 110 so as to gradually deflect the follower spring 94 downward. The downward movement of the follower spring rotates the lifter rods 88 so as to lower the front portions 91 thereof and thereby commences to lower the unsecured portions 77 of the bonding tools 74. In addition, the downward movement of the follower spring pivots the parting wire lever 112 so as to start the bar portion 120 thereof moving upward and rotates the cutter rods 145 so as to start the front portions 148 thereof moving upward. During the first part of the rotation of the disc cam by the lever, the bonding edges 82 of the bonding tools are brought into contact with the conductive lead 141. The bonding edges move the conductive lead down over the parting wire 132 and into contact with the electrode stripes 16 and 17 of the transistor 10 as shown in FIG. 10A. Further lowering of the unsecured portions of the bonding tools brings them to rest against the conductive lead and the electrode stripes. At this point the bonding tools are no longer supported by the lifter rods, and the full force due to the pretension in the bonding tools is brought to bear against the conductive lead and the stripes. This force bonds the conductive lead to the heated electrode stripe as shown in FIG. 10B.

It is to be noted that if both of the electrode stripes were not in the same plane but one of the stripes were one or two mils higher than the other so that the bonding edge of the first bonding tool came to rest against the portion of the conductive lead and the electrode stripe thereunder before the bonding edge of the second bonding tool came to rest against the portion of the conductive lead and the electrode stripe under it, this would not affect the quality of the bond. The bonding tools are independent of one another. Therefore the second bonding tool would continue its downward movement until it did come to rest against the portion of the conductive lead and the electrode stripe thereunder. Both bonding tools would exert substantially the same bonding force and so both bonds would be of the same high quality.

Figure 10A:
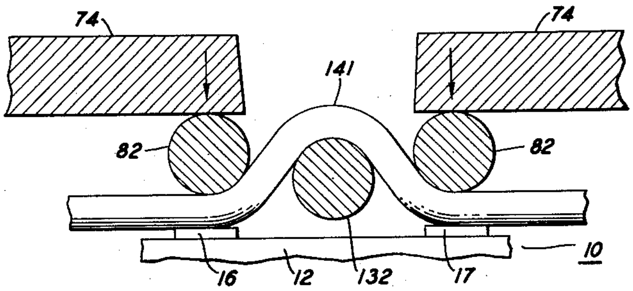
FIGS. 10, A, B, and C are greatly enlarged cross sectional views depicting the bonding of the conductive lead to the contact areas of the transistors and the parting of the conductive lead between the bonds.
Figure 10B:
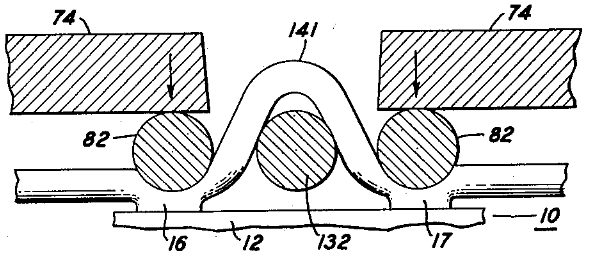
Figure 10C:
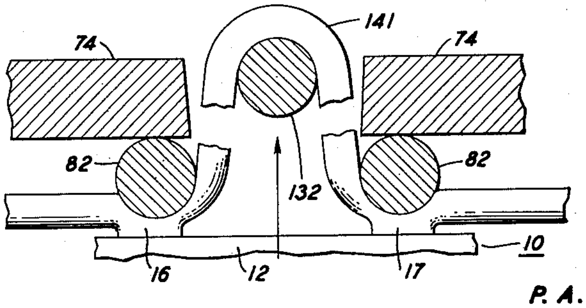

Continued clockwise rotation of the disc cam 110 by the lever 106 further deflects the follower spring downward and thereby continues the downward movement of the front portion 91 of the lifter rods 88 and the upward movement of the bar portion 120 of the parting wire lever 112 and the front portions 148 of the cutter rods 145. The downward movement of the lifter rods does not have any further affect on the bonding tools 74 since the rods are not positively connected to the tools. The upward movement of the bar portion 120 of the parting wire lever 112, however, brings it into engagement with the bottom end of the nailhead pin 131 and starts to raise the pin, thereby bringing the head of the pin into contact with the parting wire 132. Continued upward movement of the pin lifts the parting wire, and as shown in FIG. 10C, the parting wire, in turn, lifts the conductive lead and severs it between the bonds. At approximately the same time the upward movement of the front portions of the cutter rods brings the knife edges 149 thereof into engagement with the conductive lead, presses it against the underside of the bonding tools and cuts it, thereby freeing the ends of the conductive lead from the conductive lead support 138.

At this point the disc cam 110 has deflected the follower spring 94 the maximum distance downward, and further clockwise rotation of the cam-reverses the direction of the movement of the lifter rods 88, the parting wire lever 112, and the cutter rods 145. Continued clockwise rotation of the cam sequentially lowers the cutting edges 149 of the cutter rods, lowers the nailhead pin 131 and thereby the parting wire 132 back to their normal position on the parting wire carrier 122, and raises the unsecured portions 77 of the bonding tools 74. The transistor 10 is then lowered from the bonding plane, and the tool carrier 60 is moved to its rearward position. The free ends of the conductive lead are bonded to the terminals 13 and 14 of the transistor 10 by any well known means.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A bonding apparatus comprising a pair of cantilever spring hinged bonding tools, the longitudinal axes of which lie along a common axis and the unsecured portions of which are spaced one from the other, are pretensioned downward, and include a bonding edge, a conductive lead underlying the bonding tools and extending along the common longitudinal axis thereof, a parting wire underlying the conductive lead and extending at right angles thereto and between the spaced ends of the bonding tools, means for receiving a semiconductive device and heating it to a preselected temperature, means for orienting the semiconductive device so that the contact areas thereof respectively underlie the conductive lead and the bonding edges of the bonding tools, and means for lowering the unsecured portions of the bonding tools, the bonding edges thereof moving the conductive lead into contact with the contact areas and the pretension in the unsecured portions exerting a preselected force that bonds the lead to the contact areas, and means for lifting the parting wire while the bonding tools are in the bonding position thereby parting the conductive lead between the bonds.

2. A bonding apparatus as in claim 1 wherein the conductive lead is secured to a carrier and means are provided for separating the lead from the carrier while the bonding tools are in the bonding position.

3. A bonding apparatus as in claim 2 wherein the means for lowering the free ends of the bonding tools against the contact areas, the means for lifting the parting wire, and the means for separating the conductive lead from the carrier are operated sequentially by a common operator.

4. A bonding apparatus as in claim 2 wherein the separating means comprises a pair of spaced knife edges that underlie the conductive lead and the bonding tools and are moved upward, cutting the conductive lead on the bonding tools.

5. Apparatus for bonding a conductive lead to a semiconductive device having a pair of spaced contact areas arranged in substantially the same plane, the semiconductive device having been heated to a preselected temperature and the conductive lead having been positioned so that it overlies the contact areas, the apparatus comprising a pair of cantilever bonding tools the free end of each of which overlies the conductive lead at the point it crosses an individual contact area and the free ends of both of which are spaced one from the other and are pretensioned in the direction of the plane of the contact areas, a parting wire positioned between the conductive lead and the plane of the contact areas and between the spaced free ends of the bonding tools, means for moving the free ends of the bonding tools against the conductive lead, the pretension in the bonding tools exerting a predetermined force that bonds the conductive lead to the contact areas, and means for lifting the parting wire away from the plane of the contact areas while the bonding tools are in their bonding position and parting the conductive lead between the bonds.

6. Apparatus for bonding a conductive lead to a contact area of a preheated semiconductive device, the device having been positioned so that the contact area lies in a bonding plane and the conductive lead having been positioned so that it overlies the contact area, the apparatus comprising a cantilever bonding tool having a free end and a secured end, the free end assuming a position below the bonding plane when the bonding tool is in a relaxed condition, means for raising and lowering the free end while the secured end is held stationary, the raising and lowering means raising the free end above the bonding plane whereby the bonding tool is pretensioned in the direction of the bonding plane, the free end in its raised position being positioned over the conductive lead at the point it crosses the contact area, and the raising and lowering means lowering the free end toward the bonding plane and into engagement with the conductive lead, the pretension in the bonding tool exerting a force that bonds the conductive lead to the contact area.

7. Apparatus for bonding a conductive lead to the contact areas of a preheated semiconductive device, the device having been positioned so that the contact areas lie in a bonding plane and the conductive lead having been positioned so that it overlies the contact areas, the apparatus comprising a pair of cantilever bonding tools each of which has a secured end and a free end and each of which is permanently deformed along an axis transverse to the longitudinal axis thereof, the permanent deformation resulting in the free ends being positioned below the bonding plane when the bonding tools are in a relaxed condition, and means for raising and lowering the free ends while the secured ends are held stationary, the raising and lowering means raising the free ends to a position overlying the conductive lead at the respective points it crosses the individual contact areas whereby the bonding tools are pretensioned in the direction of the bonding plane, and the raising and lowering means lowering the free ends toward the bonding plane and into engagement with the conductive lead, the pretension in the bonding tools exerting a force that bonds the conductive leads to the contact areas.

8. Apparatus for bonding a conductive lead to contact areas of a preheated semiconductive device, the device having been positioned so that the contact areas lie in a bonding plane and the conductive lead having been positioned so that it overlies the contact areas, the apparatus comprising a pair of cantilever bonding tools each of which has a secured end held in a fixed plane and each of which is permanently deformed along an axis transverse to the longitudinal axis thereof, the permanent deformation resulting in the free ends being positioned below the bonding plane when the bonding tools are in a relaxed condition, means for raising and lowering the free ends and means for displacing the secured ends within the fixed plane, the raising and lowering means raising the free ends to a position above the bonding plane whereby the tools are pretensioned in the direction of the bonding plane, the displacing means positioning the free ends over the conductive lead at the point it crosses the contact areas, and the raising and lowering means lowering the free ends of the bonding tools toward the bonding plane and into engagement with the conductive lead, the pretension in the bonding tools exerting a force that bonds the conductive lead to the contact areas.

9. A bonding apparatus as in claim 8 wherein the fixed plane in which the secured ends of the cantilever bonding tools lie is approximately coplanar with the bonding plane, the free ends of the bonding tools when lowered toward the bonding plane moving substantially perpendicular to the conductive lead.

10. Apparatus for bonding a conductive lead to a semiconductor device having a pair of spaced contact areas arranged in substantially the same plane, the conductive lead having been positioned so that it overlies the contact areas, the apparatus comprising a pair of cantilever bonding tools the free end of each of which overlies the conductive lead at the point it crosses an individual contact area and the free ends of both of which are spaced one from the other, a parting wire positioned between the conductive lead and the plane of the contact areas and between the spaced free ends of the bonding tools, means for moving the free ends of the bonding tools against the conductive lead, the bonding tools exerting a predetermined force that bonds the conductive lead to the contact areas, and means for lifting the parting wire away from the plane of the contact areas while the bonding tools are in their bonding position and parting the conductive lead between the bonds.

11. Apparatus for bonding a conductive lead to a pair of spaced contact areas arranged in substantially the same plane, the conductive lead having been positioned so that it overlies the contact areas, the apparatus comprising a pair of spaced bonding tools each of which overlies the conductive lead at the point it crosses an individual contact area, a parting wire positioned between the conductive lead and the plane of the contact areas and between the bonding tools, means for moving the bonding tools against the conductive lead, the bonding tools exerting a predetermined force that bonds the conductive lead to the contact areas, and means for lifting the parting wire away from the plane of the contact areas while the bonding tools are in their bonding position and parting the conductive lead between the bonds.

12. Apparatus for bonding a conductive lead to a contact area, the contact area having been positioned in a bonding plane and the conductive lead having been positioned so that it overlies the contact area, the apparatus comprising a cantilever bonding tool having a portion thereof secured and a portion thereof extending unsecured from the secured portion, the free end of the unsecured portion having a bonding edge and the unsecured portion being permanently deformed, the permanent deformation resulting in the free end assuming a position below the bonding plane when the tool is in a relaxed condition, means for raising and lowering the free end while the secured end is held stationary, the raising and lowering means raising the free end to a position overlying the conductive lead at the point it crosses the contact area whereby the bonding tool is pretensioned in the direction of the bonding plane, and the raising and lowering means lowering the free end toward the bonding plane and into engagement with the conductive lead, the pretension in the bonding tool exerting a force that bonds the conductive lead to the contact area.

13. Apparatus for bonding a conductive lead to a contact area, the contact area having been positioned in a bonding plane and the conductive lead having been positioned so that it overlies the contact area, the apparatus comprising a cantilever bonding tool having a portion thereof secured and a portion thereof extending unsecured from the secured portion, the unsecured portion having a spring hinge section and a rigid section, the spring hinge section being in series with and intermediate the rigid section and the secured portion, the free end of the rigid section having a bonding edge, the spring hinge section being permanently deformed along an axis transverse to the longitudinal axis of the bonding tool, the permanent deformation resulting in the free end assuming a position below the bonding plane when the tool is in a relaxed condition, means for raising and lowering the free end while the secured end is held stationary, the raising and lowering means raising the free end to a position overlying the conductive lead at the point it crosses the contact area whereby the bonding tool is pretensioned in the direction of the bonding plane, and the raising and lowering means lowering the free end toward the bonding plane and into engagement with the conductive lead, the pretension in the bonding tool exerting a force that bonds the conductive lead to the contact area.

14. A bonding tool as in claim 13 wherein the permanent deformation in the spring hinge occurs along an axis one-third of the length of the spring hinge from the secured portion and two-thirds of the length of the spring hinge from the rigid section.

15. A bonding tool as in claim 13 wherein the rigid section has a shape approximating a constant stress cantilever member.

16. A bonding tool as in claim 13 wherein the longitudinal axis of the bonding edge extends perpendicular to the longitudinal axis of the bonding tool.

17. A bonding tool as in claim 16 wherein the bonding edge comprises a tungsten wire secured to the rigid section.

18. A bonding tool as in claim 13 wherein the tool is a leaf spring the unsecured portion of which has an area that is reduced in cross section to provide the spring hinge section and an area that is embossed approximately parallel to the longitudinal axis thereof to provide the rigid section.

References Cited in the file of this patent

UNITED STATES PATENTS

| | | |
|---|---|---|
| 2,458,340 | Bureau | Jan. 4, 1949 |
| 2,495,044 | Williams | Jan. 17, 1950 |
| 2,606,268 | Pityo et al. | Aug. 5, 1952 |
| 2,795,687 | Hall et al. | June 11, 1957 |
| 2,796,512 | Gray | June 18, 1957 |
| 2,885,530 | Bell | May 5, 1959 |
| 2,894,112 | Brescka et al. | July 7, 1959 |
| 2,928,931 | Hoopes et al. | Mar. 15, 1960 |

FOREIGN PATENTS

| | | |
|---|---|---|
| 673,890 | Great Britain | June 11, 1952 |